US008254762B2

(12) United States Patent
Wang et al.

(10) Patent No.: US 8,254,762 B2
(45) Date of Patent: Aug. 28, 2012

(54) MANAGEMENT OF DYNAMIC PROGRAM CHANGES IN DVB SYSTEMS

(75) Inventors: Jie Wang, Antony (FR); Peggi Abreu, Montrouge (FR); Fabrice Geslin, Paris (FR); Perry Smith, Maale Adumim (IL)

(73) Assignee: NDS Limited, Staines, Middlesex (GB)

( * ) Notice: Subject to any disclaimer, the term of this patent is extended or adjusted under 35 U.S.C. 154(b) by 1255 days.

(21) Appl. No.: 11/920,664

(22) PCT Filed: Jan. 16, 2006

(86) PCT No.: PCT/IL2006/000063
§ 371 (c)(1),
(2), (4) Date: Jan. 22, 2008

(87) PCT Pub. No.: WO2007/080564
PCT Pub. Date: Jul. 19, 2007

(65) Prior Publication Data
US 2008/0285943 A1 Nov. 20, 2008

(51) Int. Cl.
*H04N 5/76* (2006.01)
(52) U.S. Cl. ....................................... 386/296
(58) Field of Classification Search ............ 386/46, 386/296
See application file for complete search history.

(56) References Cited

U.S. PATENT DOCUMENTS

| 5,844,620 A | 12/1998 | Coleman et al. |
| 5,963,264 A | 10/1999 | Jackson |
| 6,795,639 B1 | 9/2004 | Lord |
| 2003/0121042 A1 | 6/2003 | Franken et al. |
| 2004/0114052 A1 | 6/2004 | Sin |
| 2005/0141871 A1 | 6/2005 | Watanabe |
| 2005/0232592 A1 | 10/2005 | Kimoto et al. |
| 2006/0029369 A1 | 2/2006 | Ohde et al. |
| 2006/0083483 A1 | 4/2006 | Suzuki |
| 2006/0248203 A1 | 11/2006 | Yamaoka et al. |

FOREIGN PATENT DOCUMENTS

| EP | 1 058 454 A2 | 12/2000 |
| EP | 1 162 839 A2 | 12/2001 |
| EP | 1 231 787 A1 | 8/2002 |
| EP | 1 235 431 A1 | 8/2002 |
| EP | 1 292 137 A1 | 3/2003 |
| EP | 1 622 371 | 3/2004 |
| JP | 2002-084472 | 3/2002 |
| JP | 2004-072443 | 3/2004 |
| WO | WO 97/49237 | 12/1997 |
| WO | WO 2004/051996 A1 | 6/2004 |
| WO | WO 2004-082268 A1 | 9/2004 |
| WO | WO 2005/029859 A1 | 3/2005 |

OTHER PUBLICATIONS

Nov. 23, 2009 Office Communication in connection with EP 06 700 650.2.
Iino Daisuke et al., "Digital Broadcasting Systems. (II). Real-time EPG System" (Matsushita Technical Journal, vol. 46, No. 6, 2000) [Abstract only]; Available on the World Wide Web at: http://sciencelinks.jp/j-east/article/200105/000020010501A0115504.php.

(Continued)

*Primary Examiner* — Jacob Lipman
(74) *Attorney, Agent, or Firm* — Husch Blackwell LLP (57) ABSTRACT

A method for managing dynamic program changes in a digital video broadcasting (DVB) system, the method including detecting a dynamic program change in a DVB transmission received at a set-top box (STB), and changing a digital video recorder (DVR) recording instruction associated with the program to record the program in accordance with a parameter of the change.

7 Claims, 4 Drawing Sheets

OTHER PUBLICATIONS

"Digital Video Broadcasting (DVB); Carriage and Signalling of the TV-Anytime Information in DVB Transport Streams" (European Broadcasting Union Union Europeenne de Radio-Television, ESTI TS 102 323 V1.2.1, Nov. 2005).

Feb. 24, 2012 Office Communication in connection with prosecution of EP 11180965.3.

Feb. 24, 2012 Office Communication in connection with prosecution of EP 11181035.4.

Fig. 2B ously scheduled duration, the end of the program will not
MANAGEMENT OF DYNAMIC PROGRAM CHANGES IN DVB SYSTEMS The present application is a 35 USC §371 application of PCT/IL2006/000063, filed on 16 Jan. 2006 and entitled "Management Of Dynamic Program Changes In DVB Systems", which was published on 19 Jul. 2007 in the English language with International Publication Number WO 2007/080564.

FIELD OF THE INVENTION

The present invention relates to television systems in general, and more particularly to management of dynamic program changes in Digital Video Broadcasting (DVB) systems.

BACKGROUND OF THE INVENTION

Digital Video Recorders (DVR) typically allow television viewers to schedule the recording of television programs in advance of their broadcast times. Electronic Program Guide (EPG) data containing several day's worth of program scheduling information are typically provided to the viewer's DVR. Given this information, the viewer may, via an interface provided for this purpose, configure the DVR with instructions to record a desired program that is to be broadcast on a specific channel at a given start time and for a given duration. When the start time of the program broadcast arrives, the DTV decoder automatically tunes to the indicated channel and begins recording the program with its integrated recording device or an external one for the indicated duration.

EPG data are typically broadcast at set intervals by the head-end or on an as-needed basis as the EPG data change. In accordance with the Digital Video Broadcasting (DVB) system standard, EPG data are delivered in the form of DVB service information (DVB-SI) standard Event Information Tables (EIT). In other DVB-compatible systems, private EPG data formats are used to deliver EPG data using MPEG and DVB-compatible private data channels. Various methods may be used to notify DVRs of updated EPG data, including:

Delivering updated EPG data subsequent to each change in a program schedule

Periodically delivering updated EPG data

Delivering present and following program information for each channel at the time of a program broadcast.

For the latest updated information about present and following programs, DVRs typically use DVB-SI standard EIT present/following (EIT p/f) tables or equivalent private formats.

Once a DVR is configured to record a program, a schedule change made just prior to or during the program's scheduled broadcast may result in the wrong program being recorded. For example, if a program to be recorded is cancelled or moved to another channel, the DVR will record the wrong program. If the duration of the program is extended beyond its originally scheduled duration, the end of the program will not be recorded. Similarly, if the duration of the program is extended beyond its originally scheduled duration, and the extended portion of the program is broadcast on another channel, the end of the program will not be recorded. An example that illustrates this is a tennis match of the Paris Open Championship that starts on public channel F2 at 6 p.m. and is scheduled to run until 8 p.m. Should the match run long, and a national news program is scheduled to start on channel F2 at 8 p.m., the match broadcast may switch to another public channel F3 at 8 p.m., leaving those who programmed their DVR to record the match according to the original schedule without a recording of the match finale. Another example of a schedule change made just prior to a program's being broadcast and that results in the wrong program being recorded is when a program is unexpectedly stopped and later resumed on the same channel, such as where a live sporting program is interrupted for a breaking news report and then continues with a delayed broadcast in a later time slot. Although current EIT p/f tables can be used to indicate changes in the duration of the current program, they may not be used to convey information related to a new time and broadcast location for a displaced program.

SUMMARY OF THE INVENTION

The present invention provides systems and methods relating to management of dynamic program changes in Digital Video Broadcasting (DVB) systems.

In one aspect of the present invention a method is provided for managing dynamic program changes in a digital video broadcasting (DVB) system, the method including detecting a dynamic program change in a DVB transmission received at a set-top box (STB), and changing a digital video recorder (DVR) recording instruction associated with the program to record the program in accordance with a parameter of the change.

In another aspect of the present invention the method further includes displaying a message informing a viewer of the program change.

In another aspect of the present invention the method further includes storing information relating to the program change.

In another aspect of the present invention a method is provided for managing dynamic program changes in a digital video broadcasting (DVB) system, the method including providing a program descriptor indicating a dynamic program change in a DVB transmission, detecting the presence of the program descriptor, and changing a digital video recorder (DVR) recording instruction associated with the program to record the program in accordance with a parameter of the program descriptor.

In another aspect of the present invention the providing step includes configuring a DVB Service Information (DVB-SI) compliant Event Information Table (EIT) with the program descriptor.

In another aspect of the present invention the providing step includes configuring a private dynamic program signaling data set for DVB-compliant systems with the program descriptor.

In another aspect of the present invention the providing step includes providing the program descriptor within an program loop of the program associated with the dynamic program change.

In another aspect of the present invention the providing step includes configuring the program descriptor to indicate the move of the program from a channel on which the program was originally scheduled to be broadcast to another channel.

In another aspect of the present invention the providing step includes configuring the program descriptor to indicate the extension of a scheduled program beyond its originally scheduled duration on a channel on which the program was originally scheduled to be broadcast, and the broadcast of the extended portion on another channel.

In another aspect of the present invention the providing step includes configuring the program descriptor to indicate the interruption of a scheduled program and a subsequent continuation of the program.

In another aspect of the present invention the configuring step includes configuring to indicate the continuation of the program on either a channel on which the program was originally scheduled to be broadcast or another channel.

In another aspect of the present invention the providing step includes configuring the program descriptor to indicate a channel that is different from a channel on which the program was originally scheduled to be broadcast.

In another aspect of the present invention the method further includes displaying a message informing a viewer of the program change.

In another aspect of the present invention the method further includes storing information relating to the program change.

In another aspect of the present invention a method is provided for managing dynamic program changes in a digital video broadcasting (DVB) system, the method including receiving a program schedule, checking if a program with which a digital video recorder (DVR) recording instruction is associated is in the program schedule, if the program is in the program schedule, checking if any broadcast parameter indicated for the program in the program schedule differs from any corresponding broadcast parameter indicated for the program in a previously-received program schedule, and adjusting the recording instruction in accordance with the differing broadcast parameter.

In another aspect of the present invention a method is provided for managing dynamic program changes in a digital video broadcasting (DVB) system, the method including receiving a program schedule, checking if a program with which a digital video recorder (DVR) recording instruction is associated is no longer in the program schedule, if the program is no longer in the program schedule, checking if the program schedule includes a program displacement descriptor (PDD) associated with the program's channel and time slot as indicated by the recording instruction, and adjusting the recording instruction in accordance with the any broadcast parameter associated with the PDD for the program.

In another aspect of the present invention a method is provided for managing dynamic program changes in a digital video broadcasting (DVB) system, the method including receiving a program schedule, checking if a program with which a digital video recorder (DVR) recording instruction is associated is no longer in the program schedule, and if the program is no longer in the program schedule, canceling the recording instruction.

In another aspect of the present invention the method further includes checking if the program schedule includes a program displacement descriptor (PDD) associated with the program's channel and time slot as indicated by the recording instruction, and where the canceling step includes canceling where no associated PDD is found.

In another aspect of the present invention the method further includes displaying a message informing a viewer of the cancellation of the recording instruction.

In another aspect of the present invention a method is provided for managing dynamic program changes in a digital video broadcasting (DVB) system, the method including receiving Present & Following Program Information associated with a channel on which the program is to be recorded in accordance with a recording instruction, checking if either of the present program and the following program indicated by the Present & Following Program Information has the same program identifier as the program indicated by the recording instruction, and recording the program in accordance with a broadcast parameter indicated by the Present & Following Program Information for the program where the broadcast parameter differs from a corresponding recording parameter in the recording instruction, indicating a program change.

In another aspect of the present invention the receiving step is performed at a predefined time prior to recording a program in accordance with the recording instruction.

In another aspect of the present invention the method further includes, if the present program identifier matches, recording the program until an end time indicated by the Present & Following Program Information for the program.

In another aspect of the present invention the method further includes, if the following program identifier matches, recording the program from a start time and until an end time indicated by the Present & Following Program Information for the program.

In another aspect of the present invention the method further includes, if neither of the program identifiers match, checking if either of the present and following programs is associated with a program displacement descriptor (PDD) identifying the program, and if such a PDD is found, resetting any parameters of the recording instruction in accordance with any corresponding parameters in the PDD.

In another aspect of the present invention the receiving step is performed while recording a program in accordance with the recording instruction.

In another aspect of the present invention the method further includes if neither of the program identifiers matches, ceasing the recording the program.

In another aspect of the present invention the method further includes, if the present program identifier matches, updating a program recording termination time of the recording instruction if the Present & Following Program Information indicates a termination time for the program that differs from the program recording termination time.

In another aspect of the present invention the method further includes, if the present program identifier matches and the present program is associated with a program_continuation_descriptor (PCD) indicating that the program is to be continued on the program's current channel after an interruption, setting a new recording instruction in accordance with the information provided by the PCD.

In another aspect of the present invention the method further includes, if the present program identifier matches and the present program is associated with a program_continuation_descriptor (PCD) indicating that the program is to be continued on a different channel than the program's current channel after an interruption, setting a new recording instruction in accordance with the information provided by the PCD.

In another aspect of the present invention the method further includes displaying a message informing a viewer of the program change.

In another aspect of the present invention the method further includes storing information relating to the program change.

In another aspect of the present invention the method further includes displaying a message informing a viewer of an effect of the program change.

In another aspect of the present invention the displaying step includes displaying the message to indicate that the end of the present program will be truncated.

In another aspect of the present invention the displaying step includes displaying the message to indicate that the beginning of the following program will be skipped.

In another aspect of the present invention the displaying step includes prises displaying the message to indicate that the following program will be condensed.

In another aspect of the present invention the method further includes inserting the message into a textual description of the program in either of a program schedule and the Present & Following Program Information.

In another aspect of the present invention the method further includes inserting the message into a program_message descriptor (PMD) within the Present & Following Program Information associated with the program.

In another aspect of the present invention the method further includes indicating the program change within the PMD.

In another aspect of the present invention the method further includes recording either of the present and following programs in accordance with information contained in the PMD.

In another aspect of the present invention the method further includes subsequently recording the program in its entirety during a rebroadcast indicated by the PMD.

In another aspect of the present invention a system is provided for managing dynamic program changes in a digital video broadcasting (DVB) system, the system including a digital video recorder (DVR) configured to record a program in accordance with a recording instruction associated with the program, and a set-top box (STB) configured to detect a dynamic program change in a DVB transmission and change the recording instruction to record the program in accordance with a parameter of the change.

In another aspect of the present invention either of the DVR and the STB is configured to display a message informing a viewer of the program change.

In another aspect of the present invention either of the DVR and the STB is configured to store information relating to the program change.

In another aspect of the present invention a system is provided for managing dynamic program changes in a digital video broadcasting (DVB) system, the system including a digital video recorder (DVR) configured to record a program in accordance with a recording instruction associated with the program, and a set-top box (STB) configured to detect the presence of a program descriptor indicating a dynamic program change in a DVB transmission and change the recording instruction to record the program in accordance with a parameter of the program descriptor.

In another aspect of the present invention the program descriptor is provided together with a DVB Service Information (DVB-SI) compliant Event Information Table (EIT).

In another aspect of the present invention the program descriptor is provided together with a private dynamic program signaling data set for DVB-compliant systems.

In another aspect of the present invention the program descriptor is provided within an program loop of the program associated with the dynamic program change.

In another aspect of the present invention the program descriptor indicates the move of the program from a channel on which the program was originally scheduled to be broadcast to another channel.

In another aspect of the present invention the program descriptor indicates the extension of a scheduled program beyond its originally scheduled duration on a channel on which the program was originally scheduled to be broadcast, and the broadcast of the extended portion on another channel.

In another aspect of the present invention the program descriptor indicates the interruption of a scheduled program and a subsequent continuation of the program.

In another aspect of the present invention the program descriptor indicates the continuation of the program on either a channel on which the program was originally scheduled to be broadcast or another channel.

In another aspect of the present invention the program descriptor indicates a channel that is different from a channel on which the program was originally scheduled to be broadcast.

In another aspect of the present invention the system further includes a head end operative to configure the program descriptor.

In another aspect of the present invention either of the STB and the DVR is configured to display a message informing a viewer of the program change.

In another aspect of the present invention either of the STB and the DVR is configured to store information relating to the program change.

In another aspect of the present invention a system is provided for managing dynamic program changes in a digital video broadcasting (DVB) system, the system including a digital video recorder (DVR) configured to record a program in accordance with a recording instruction associated with the program, and a set-top box (STB) configured to receive a program schedule, check if a program with which the recording instruction is associated is in the program schedule, if the program is in the program schedule, check if any broadcast parameter indicated for the program in the program schedule differs from any corresponding broadcast parameter indicated for the program in a previously-received program schedule, and adjust the recording instruction in accordance with the differing broadcast parameter.

In another aspect of the present invention a system is provided for managing dynamic program changes in a digital video broadcasting (DVB) system, the system including a digital video recorder (DVR) configured to record a program in accordance with a recording instruction associated with the program, and a set-top box (STB) configured to receive a program schedule, check if a program with which the recording instruction is associated is no longer in the program schedule, if the program is no longer in the program schedule, check if the program schedule includes a program displacement descriptor (PDD) associated with the program's channel and time slot as indicated by the recording instruction, and adjust the recording instruction in accordance with the any broadcast parameter associated with the PDD for the program.

In another aspect of the present invention a system is provided for managing dynamic program changes in a digital video broadcasting (DVB) system, the system including a digital video recorder (DVR) configured to record a program in accordance with a recording instruction associated with the program, and a set-top box (STB) configured to receive a program schedule, check if a program with which the recording instruction is associated is no longer in the program schedule, and if the program is no longer in the program schedule, cancel the recording instruction.

In another aspect of the present invention the STB is configured to check if the program schedule includes a program displacement descriptor (PDD) associated with the program's channel and time slot as indicated by the recording instruction, and cancel the recording instruction where no associated PDD is found.

In another aspect of the present invention either of the STB and the DVR is configured to display a message informing a viewer of the cancellation of the recording instruction.

In another aspect of the present invention a system is provided for managing dynamic program changes in a digital video broadcasting (DVB) system, the system including a digital video recorder (DVR) configured to record a program in accordance with a recording instruction associated with the program, and a set-top box (STB) configured to receive Present & Following Program Information associated with a channel on which the program is to be recorded in accordance with a recording instruction, check if either of the present program and the following program indicated by the Present & Following Program Information has the same program identifier as the program indicated by the recording instruction, and cause the DVR to record the program in accordance with a broadcast parameter indicated by the Present & Following Program Information for the program where the broadcast parameter differs from a corresponding recording parameter in the recording instruction, indicating a program change.

In another aspect of the present invention the STB performs as configured at a predefined time prior to the recording of the program in accordance with the recording instruction.

In another aspect of the present invention the STB is operative, if the present program identifier matches, to record the program until an end time indicated by the Present & Following Program Information for the program.

In another aspect of the present invention the STB is operative, if the following program identifier matches, to record the program from a start time and until an end time indicated by the Present & Following Program Information for the program.

In another aspect of the present invention the STB is operative, if neither of the program identifiers match, to check if either of the present and following programs is associated with a program displacement descriptor (PDD) identifying the program, and if such a PDD is found, reset any parameters of the recording instruction in accordance with any corresponding parameters in the PDD.

In another aspect of the present invention the STB is configured to receive the Present & Following Program Information while recording a program in accordance with the recording instruction.

In another aspect of the present invention the STB is operative to cause the DVR to cease the recording the program if neither of the program identifiers matches.

In another aspect of the present invention the STB is operative, if the present program identifier matches, to update a program recording termination time of the recording instruction if the Present & Following Program Information indicates a termination time for the program that differs from the program recording termination time.

In another aspect of the present invention the STB is operative, if the present program identifier matches and the present program is associated with a program_continuation_descriptor (PCD) indicating that the program is to be continued on the program's current channel after an interruption, to set a new recording instruction in accordance with the information provided by the PCD.

In another aspect of the present invention the STB is operative, if the present program identifier matches and the present program is associated with a program_continuation_descriptor (PCD) indicating that the program is to be continued on a different channel than the program's current channel after an interruption, to set a new recording instruction in accordance with the information provided by the PCD.

In another aspect of the present invention either of the STB and the DVR is configured to display a message informing a viewer of the program change.

In another aspect of the present invention either of the STB and the DVR is configured to store information relating to the program change.

In another aspect of the present invention either of the STB and the DVR is configured to display a message informing a viewer of an effect of the program change.

In another aspect of the present invention the message indicates that the end of the present program will be truncated.

In another aspect of the present invention the message indicates that the beginning of the following program will be skipped.

In another aspect of the present invention the message indicates that the following program will be condensed.

In another aspect of the present invention the system further includes a message inserted into a textual description of the program in either of a program schedule and the Present & Following Program Information.

In another aspect of the present invention the system further includes a message inserted into a program_message descriptor (PMD) within the Present & Following Program Information associated with the program.

In another aspect of the present invention the PMD indicates the program change.

In another aspect of the present invention STB is operative to cause the DVR to record either of the present and following programs in accordance with information contained in the PMD.

In another aspect of the present invention STB is operative to cause the DVR to subsequently record the program in its entirety during a rebroadcast indicated by the PMD.

It is appreciated throughout the specification and claims that the term "program" refers to a DVB-SI specified event or equivalent.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
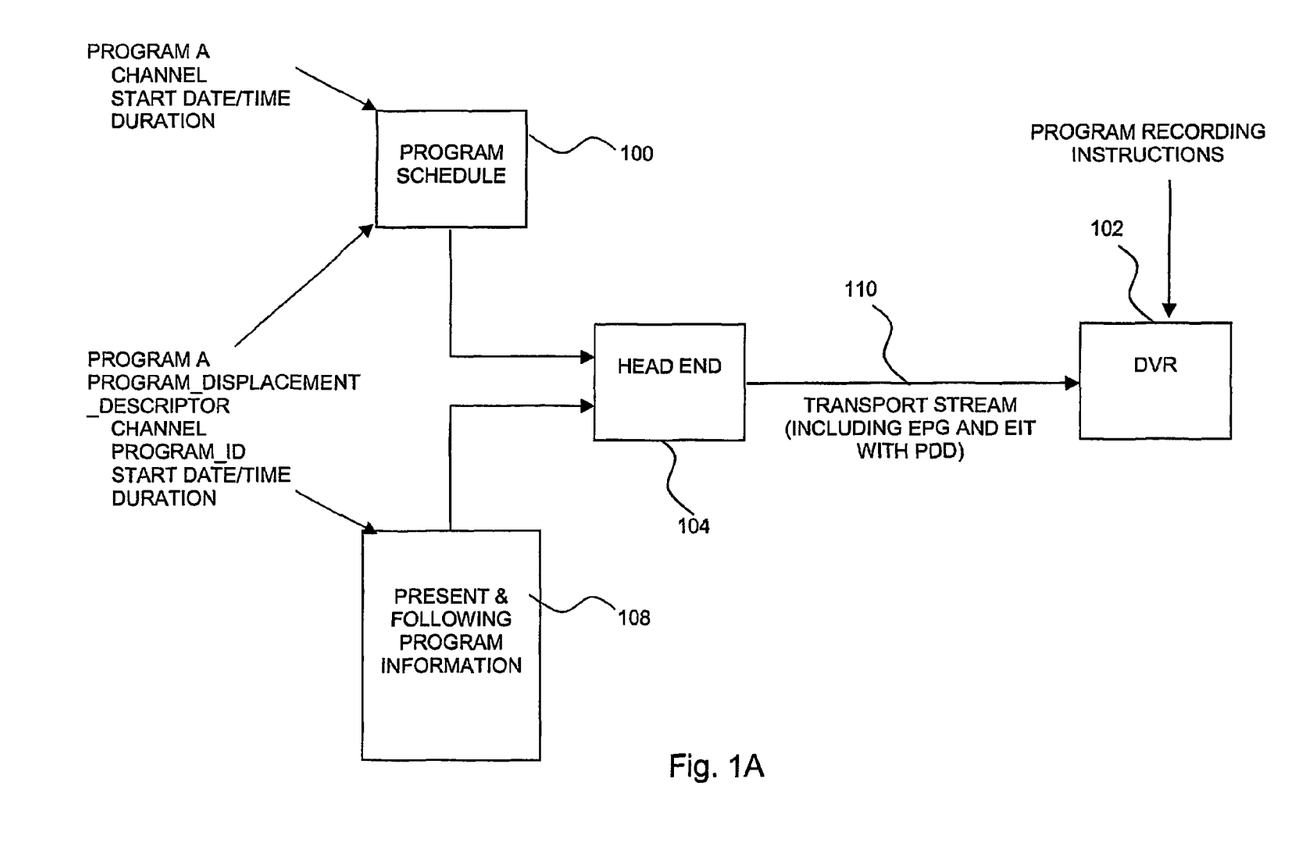
FIG. 1A is a simplified conceptual illustration of a system for managing dynamic program changes in Digital Video Broadcasting (DVB) systems, configured to manage dynamic program changes, constructed and operative in accordance with a preferred embodiment of the present invention.
Figure 1B:
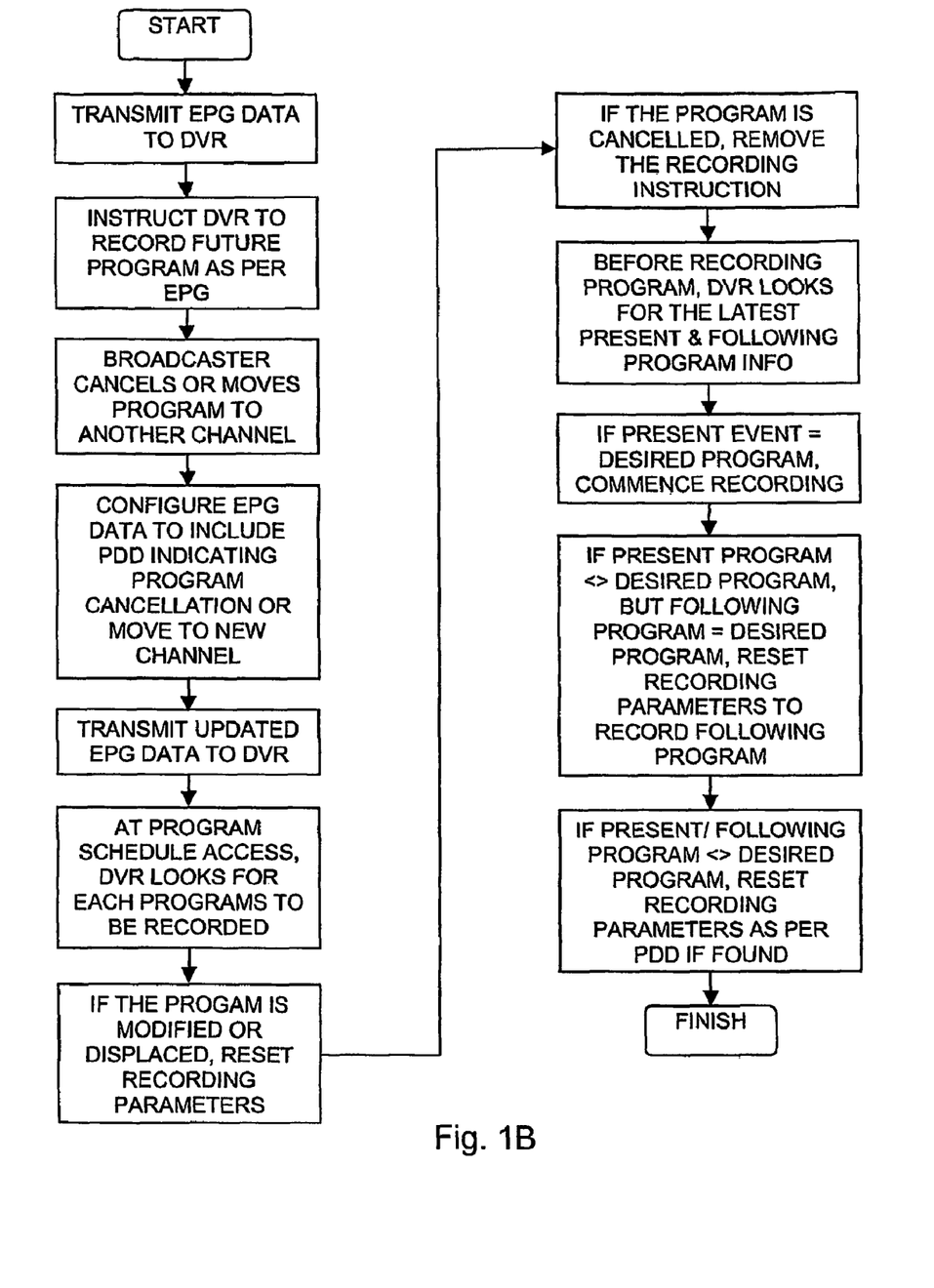
FIG. 1B is a simplified flowchart illustration of an exemplary method of operation of the system of FIG. 1A, operative in accordance with a preferred embodiment of the present invention.

Reference is now made to FIG. 1A, which is a simplified conceptual illustration of a system for managing dynamic program changes in Digital Video Broadcasting (DVB) systems, constructed and operative in accordance with a preferred embodiment of the present invention, and additionally to FIG. 1B, which is a simplified flowchart illustration of an exemplary method of operation of the system of FIG. 1A, operative in accordance with a preferred embodiment of the present invention. In FIGS. 1A and 1B, a Program Schedule 100, being an EPG or equivalent private programming guide for DVB-compliant systems, and such as may be conveyed via DVB Service Information (DVB-SI) compliant Event Information Tables (EIT), is configured to provide information regarding a program A, including the channel on which program A is to be broadcast, the scheduled start date and time of program A's broadcast, and program A's scheduled duration. Program Schedule 100 is then transmitted to an DVR 102, such as by a broadcaster from a head end 104 via a transport stream 110, in accordance with conventional techniques. Program Schedule 100 is then provided by DVR 102 to a viewer who may then, in advance of the broadcast of program A and in accordance with conventional techniques, instruct DVR 102 to record program A. DVR 102 then stores the instruction for future implementation.

If, prior to its scheduled broadcast, the broadcaster wishes to move program A to another channel, Present & Following Program Information 108, being an EIT p/f or equivalent private dynamic program signalling data set for DVB-compliant systems, is preferably configured to include a program_displacement_descriptor (PDD) in the relevant program loop for program A on the originally-scheduled channel. The PDD is preferably configured to indicate the new channel, program identifier, start time, and duration. The same modifications are also preferably made to Program Schedule 100.

In the broadcaster cancels program A, the information about program A is preferably removed from Program Schedule 100 and Present & Following Program Information 108 the broadcast. Where private or other non-DVB but DVB-compliant EPG data formats are used, the same information indicated by the PDD described above is preferably inserted into the EPG data that are equivalent to that which is found in Program Schedule 100 and Present & Following Program Information 108. Program Schedule 100 and Present & Following Program Information 108 are then transmitted to DVR 102, which adjusts any scheduled recordings according to relevant changes in the EPG data. Recordings scheduled for programs that are no longer found in the to-be-recorded time slot are preferably cancelled.

Each time DVR 102 receives a Program Schedule 100, the following operations may be performed by DVR 102 for each recording instruction:
  Check if the program to which the recording instruction relates is in Program Schedule 100. If the program is in the new Program Schedule 100, check if its broadcast parameters have been modified as compared with the previously-received Program Schedule 100. If they have been modified, DVR 102 preferably adjusts the recording instruction according to the new broadcast information.
  If the program is no longer in the new Program Schedule 100, and if a PDD is found on the program's original channel in the same time slot, as indicated by the recording instruction, indicating that a program displacement is indicated for the program, DVR 102 preferably uses the PDD to find the new broadcast parameters of the displaced program in the new Program Schedule 100 and adjusts the recording instruction for the program accordingly.
  If the program is no longer in the new Program Schedule 100 and if no relevant PDD is found, the program is preferably cancelled from the list of programs to be recorded. A message may be displayed informing the viewer of the cancellation of the recording instruction.

When a program recording instruction is to be modified, if the modification would place the program recording instruction in conflict with other existing program instructions or otherwise present a conflict regarding the use of DVR resources with respect to other applications, an appropriate resolution mechanism, automatic or one requiring user/viewer input, may be used to resolve the conflict.

At a predefined time prior to recording a program, such as a few minutes prior to recording a program, the following operations are preferably performed by DVR 102 for each recording instruction:
  Tune to TS 110 carrying the program to be recorded.
  Capture the Present & Following Program Information associated with the channel on which the program is to be recorded.
  Check if the present Program as per the Present & Following Program Information has the same program identifier as the desired program. If so, recording is preferably commenced, with the recording end time set to the end time indicated by the Present & Following Program Information.
  If the present program as per the Present & Following Program Information does not have the same program identifier as the desired program, compare the desired program identifier with the following program in the Present & Following Program Information. If the desired program identifier and the following program identifier are the same, reset the recording start time and duration according to this information.
  If neither the present program nor the following program as per Present & Following Program Information has the same program identifier as the desired program, check if the present program or the following program is associated with a PDD which identifies the desired program. If such a PDD is found, reset the recoding parameters according to the information provided by the PDD (e.g., to the service identified by the ON_ID, TS_ID and service_ID, program identifier of the new program, start_time, duration, etc.)
  If neither the present program nor the following program as per the Present & Following Program Information has the same program identifier as the desired program, nor is the present program or the following program associated with a PDD which identifies the desired program, repeat any of the above steps for a predefined period of time. If no information as mentioned above is available, DVR 102 may cancel the current recording instruction.

Figure 2A:
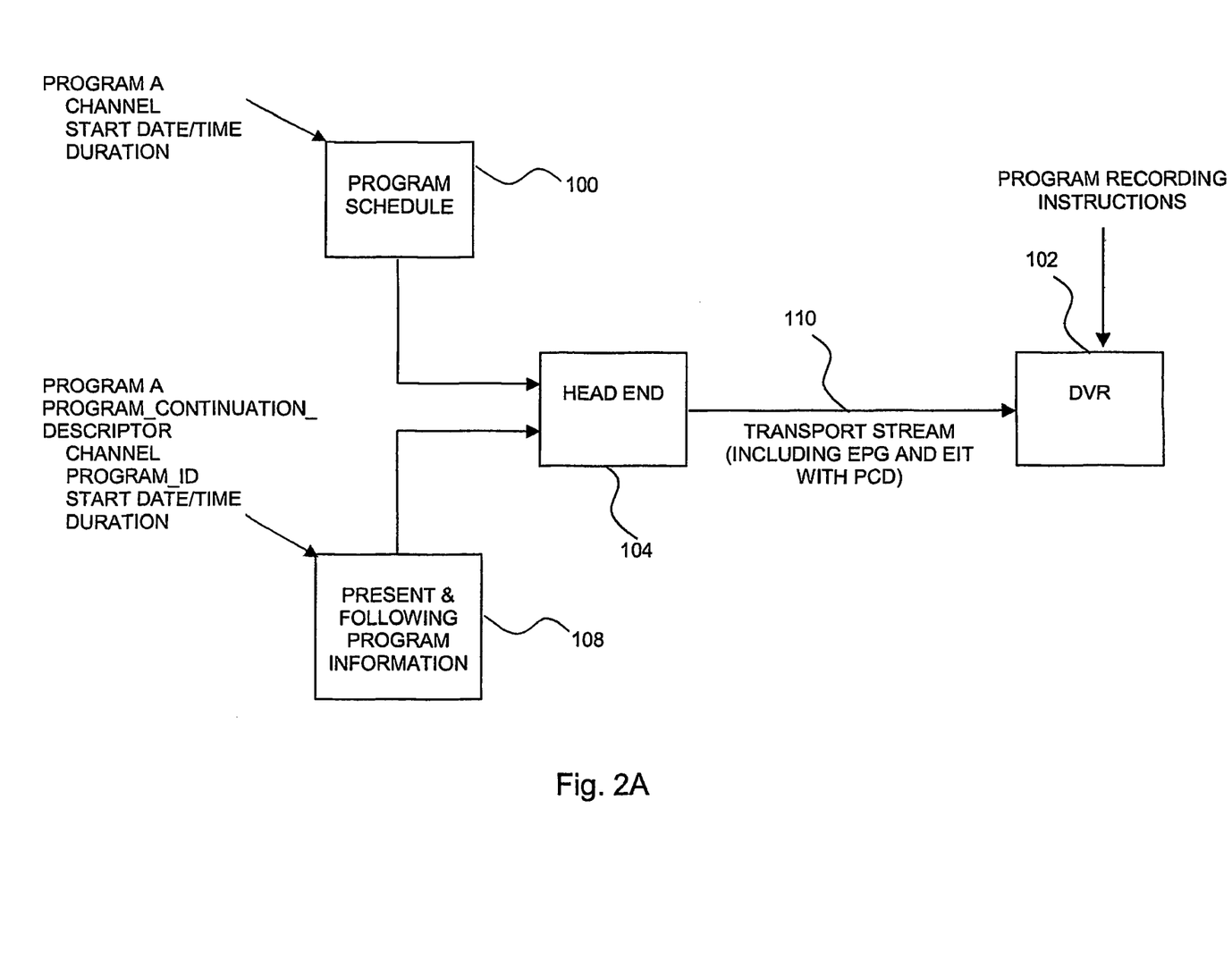
FIG. 2A is a simplified conceptual illustration of a system for managing dynamic program changes in Digital Video Broadcasting (DVB) systems, constructed and operative in accordance with a preferred embodiment of the present invention.
Figure 2B:
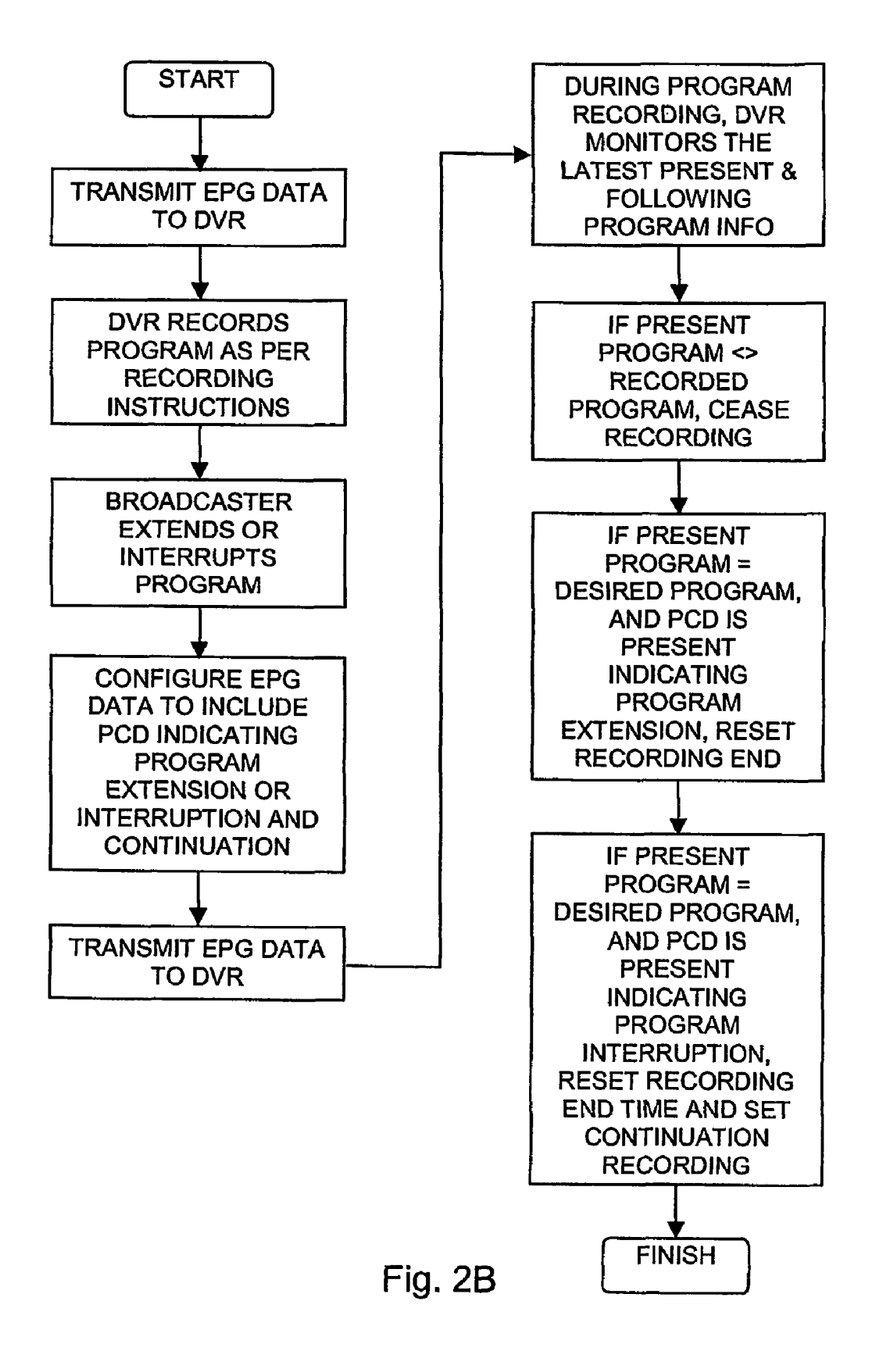
FIG. 2B is a simplified flowchart illustration of an exemplary method of operation of the system of FIG. 2A, operative in accordance with a preferred embodiment of the present invention.

Reference is now made to FIG. 2A, which is a simplified conceptual illustration of a system for managing dynamic program changes in Digital Video Broadcasting (DVB) systems, constructed and operative in accordance with a preferred embodiment of the present invention, and additionally to FIG. 2B, which is a simplified flowchart illustration of an exemplary method of operation of the system of FIG. 2A, operative in accordance with a preferred embodiment of the present invention. The system and method of FIGS. 2A and 2B are substantially similar to those of FIGS. 1A and 1B, with the notable exception that instead of program A being cancelled or moved in its entirety to another channel, in FIGS. 2A and 2B program A is broadcast at its originally scheduled start time on its originally scheduled channel, and is then either extended, with the extended portion being broadcast on either the same channel or a different channel, or interrupted and then continued on the either the same channel or on a different channel.

If, during its scheduled broadcast, the broadcaster wishes to extend program A or interrupt program A and then continue its broadcast, Present & Following Program Information 108 is preferably configured to include a program_continuation_descriptor (PCD) in the relevant program loop for program A. If program A is to be extended on the same channel without interruption, the duration value associated with the program is preferably updated accordingly. If program A is to be interrupted and continued on the same channel, the PCD is preferably configured to indicate program A's new end time and/or duration, as well as the start time, associated program identifier, and end time and/or duration of program A's continuation segment. If program A is to be interrupted and continued on a different channel, the PCD is preferably configured to indicate program A's new end time and/or duration, as well as the channel, start time, program identifier, and end time and/or duration of program A's continuation segment.

The following operations are preferably repeatedly performed by DVR 102 while recording a program in accordance with a recording instruction:

Capture the Present & Following Program Information associated with the channel on which the program is currently being recorded.

Check if the present program as per Present & Following Program Information has the same program identifier as the currently recorded program. If not, cease recording.

If the present program as per the Present & Following Program Information has the same program identifier as the currently recorded program, check the duration associated with this program. If a change is detected, update the termination time of the current recording accordingly.

If the present program as per the Present & Following Program Information has the same program identifier as the currently recorded program, if the present program is associated with a PCD indicating that the program is to be continued on the same channel after an interruption, set a new recording instruction according to the continuation information provided by the descriptor (e.g., program identifier, start_time, duration, etc.).

If the present program as per the Present & Following Program Information has the same program identifier as the currently recorded program, if the present program is associated with a PCD indicating that the program is to be continued on another channel, set a new recording instruction according to the continuation information provided by the descriptor (e.g., to the service identified by the ON_ID, TS_ID and service_ID, program identifier, start_time, duration, etc.)

It is appreciated that DVR 102 may display a message regarding any of the program changes or other actions described herein. For example, if a sports program overruns its allotted time, DVR 102 may display a message indicating that the overrun is occurring. DVR 102 may also display a message indicating the effect of the overrun, such as whether the end of the sports program will be cut out despite the overrun, whether the beginning of the next scheduled program will be skipped, or whether the next scheduled program will be truncated or condensed as a result, allowing the viewer to decide whether to stay with the channel or change to another channel. The related information is preferably associated with the affected program by updating the textual description of the program in Program Schedule 100 and/or Present & Following Program Information 108. Alternatively, Present & Following Program Information 108 may be configured to include a program_message_descriptor (PMD) in the relevant program loop for the affected program, with the PMD informing the type of change. Where a PMD is used, DVR 102 may also use the PMD in the control of a recording. For example, DVR 102 may use the PMD to decide, either automatically or after prompting the viewer, if it should continue to record the current program, the following program, or both, and what to do regarding any overruns and truncations. DVR 102 may also record information relating to the program change itself, enabling DVR 102 to inform viewers of the reason for the difference between the program as recorded and as it was originally meant to be recorded. If the EPG data includes information indicating that the program will be repeated, such as on a different channel and/or on a different time slot, DVR 102 may use this information to record a complete version of the program when it is repeated, instead of a truncated or condensed one.

It is appreciated that various features of the invention which are, for clarity, described in the contexts of separate embodiments may also be provided in combination in a single embodiment Conversely, various features of the invention which are, for brevity, described in the context of a single embodiment may also be provided separately or in any suitable subcombination.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for managing dynamic program changes in a digital video broadcasting (DVB) system, the method comprising:
   providing a program descriptor indicating:
      an interruption of the broadcast of a program which is currently being broadcast on a channel; and
      at least one of:
         a start time of a subsequent continuation of the broadcast of the program; and
         a new channel of the subsequent continuation of the broadcast of the program;
   detecting the presence of the program descriptor; and
   changing a digital video recorder (DVR) recording instruction associated with the program to record the program in accordance with a parameter of the program descriptor.

2. The method according to claim 1, wherein the providing step comprises configuring the program descriptor to indicate the new channel of the subsequent continuation of the broadcast of the program.

3. The method according to claim 1, wherein the providing step comprises configuring the program descriptor to indicate the start time of the subsequent continuation of the broadcast of the program.

4. A system for managing dynamic program changes in a digital video broadcasting (DVB) system, the system comprising:
   a digital video recorder (DVR) operative to record a program in accordance with a recording instruction associated with the program; and
   a set-top box (STB) operative to:
      detect the presence of a program descriptor indicating:
         the interruption of the broadcast of the program which is currently being broadcast on a channel; and at least one of: a start time of a subsequent continuation of the broadcast of the program; and a new channel of the subsequent continuation of the broadcast of the program; and change the recording instruction to record the program in accordance with a parameter of the program descriptor.

5. The system according to claim 4, wherein the program descriptor indicates the new channel of the continuation of the broadcast of the program.

6. The system according to claim 4, wherein the program descriptor indicates the start time of the continuation of the broadcast of the program.

7. A system for managing dynamic program changes in a digital video broadcasting (DVB) system, the system comprising:

means for recording a program in accordance with a recording instruction associated with the program;

means for detecting the presence of a program descriptor indicating: the interruption of the broadcast of the program which is currently being broadcast on a channel; and at least one of: a start time of a subsequent continuation of the broadcast of the program; and a new channel of the subsequent continuation of the broadcast of the program; and means for changing the recording instruction to record the program in accordance with a parameter of the program descriptor.

* * * * *